(12) United States Patent
Napoleon et al.

(10) Patent No.: US 11,539,899 B1
(45) Date of Patent: Dec. 27, 2022

(54) SYSTEM FOR COVERING AN AREA OF INTEREST IN A LIVE EVENT

(71) Applicant: HiLite Sports, Inc., Marina del Rey, CA (US)

(72) Inventors: Timothy Napoleon, Orange, CA (US); Joshua Lennox, Marina Del Rey, CA (US); Chris Diacov, Del Mar, CA (US)

(73) Assignee: HiLite Sports, Inc., Marina del Rey, CA (US)

(*) Notice: Subject to any disclaimer, the term of this patent is extended or adjusted under 35 U.S.C. 154(b) by 0 days.

(21) Appl. No.: 17/308,685

(22) Filed: May 5, 2021

Related U.S. Application Data

(63) Continuation-in-part of application No. 16/198,610, filed on Nov. 21, 2018, now abandoned.

(60) Provisional application No. 63/020,939, filed on May 6, 2020, provisional application No. 62/590,192, filed on Nov. 22, 2017.

(51) Int. Cl.
| | |
|---|---|
| *H04N 5/265* | (2006.01) |
| *G06T 7/80* | (2017.01) |
| *H04N 5/225* | (2006.01) |
| *H04N 5/262* | (2006.01) |

(52) U.S. Cl.
CPC ............ *H04N 5/265* (2013.01); *G06T 7/80* (2017.01); *H04N 5/2258* (2013.01); *H04N 5/2628* (2013.01); *G06T 2207/30232* (2013.01)

(58) Field of Classification Search
CPC .... H04N 5/265; H04N 5/2258; H04N 5/2628; G06T 7/80; G06T 2207/30232
See application file for complete search history.

(56) References Cited

U.S. PATENT DOCUMENTS

| | | | |
|---|---|---|---|
| 8,885,882 B1 * | 11/2014 | Yin | G06T 7/73 382/103 |
| 2009/0189982 A1 | 7/2009 | Tawiah | |
| 2009/0256688 A1 | 10/2009 | Khan | |
| 2014/0247323 A1 * | 9/2014 | Griffis | H04N 5/23238 348/36 |
| 2014/0267666 A1 * | 9/2014 | Holz | G06T 7/30 348/77 |
| 2016/0078683 A1 | 3/2016 | Sudol et al. | |

\* cited by examiner

*Primary Examiner* — Jae N Noh
(74) *Attorney, Agent, or Firm* — Suiter Swantz pc llo

(57) ABSTRACT

A system for covering an area of interest in a live event is provided. The system may include a masthead, a mast, and a base. The masthead may include a first lens and a second lens. The base may be communicatively coupled to the masthead, and may include base processors configured to determine a position of the system, determine an orientation of the masthead relative to a field of interest, calibrate a first field of view and a second field of view, identify areas of interest, record a location and time stamp of one or more objects, merge a first video and a second video into a merged video, translate a corresponding position of the objects to the merged video, generate a video window based on the translated corresponding position of the objects, and automatically adjust the video window based on changes in the objects.

19 Claims, 13 Drawing Sheets

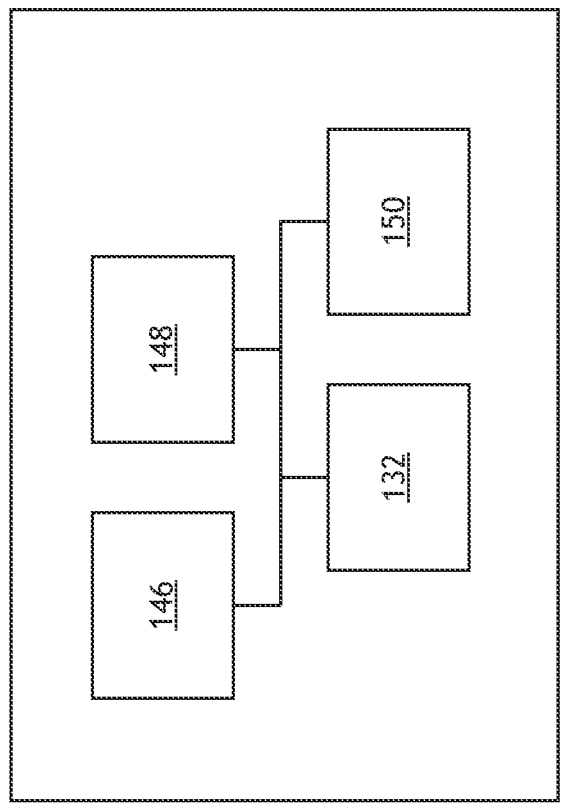

SYSTEM FOR COVERING AN AREA OF INTEREST IN A LIVE EVENT

CROSS-REFERENCE TO RELATED APPLICATION

The present application is related to and claims benefit of the earliest available effective filing date of the applications described below:

The present application claims the benefit, under 35 U.S.C. § 119(e), of U.S. Provisional Patent Application No. 63/020,939, filed May 6, 2020, which is incorporated herein by reference in the entirety; and The present application constitutes a continuation-in-part (CIP) of U.S. patent application Ser. No. 16/198,610, filed Nov. 21, 2018, which is a non-provisional patent application that claims the benefit of U.S. Provisional Patent Application No. 62/590,192, filed Nov. 22, 2017.

TECHNICAL FIELD

Embodiments of the inventive concepts disclosed herein are directed generally to the capture, synchronization, and processing of video content covering a wide area of interest in real time.

BACKGROUND

In the video coverage of a live event, it is often difficult to capture the entirety of a wide area of interest. The wide area of interest may include the fields and courts of play of sporting events, such as soccer matches or basketball games. Systems existing in the art for the video capture of live events require multiple video streams, or, in the case of a single video stream, do not produce large format video of the entire wide area of interest. It is therefore desirable to have a system for covering a wide area of interest in a live event that produces a natural view of a wide area of interest.

SUMMARY

A system for covering an area of interest in a live event is disclosed, in accordance with one or more embodiments of the present disclosure. In one embodiment, the system includes a masthead, a mast, and a base; wherein the masthead comprises: a first image sensor, a second image sensor, a first lens corresponding with the first image sensor, a second lens corresponding with the second image sensor, where the first image sensor is configured to capture a first video having a first field of view, and the second image sensor is configured to capture a second video having a second field of view, where the first field of view and the second field of view overlap at a center portion of a field of interest, a global positioning system receiver, and one or more orientation sensors; and wherein the base is communicatively coupled to the masthead via one or more datalinks of the mast and includes one or more base processors configured to: determine a position of the masthead, determine an orientation of the masthead relative to the field of interest based on one or more signals received from the one or more orientation sensors, calibrate the first field of view and the second field of view, identify one or more areas of interest within the first field of view and the second field of view, record a location and time stamp of one or more objects within the one or more areas of interest, merge the first video and the second video into a merged video, translate a video window based on the translated corresponding position of the one or more objects, wherein the video window displays the one or more areas of interest, and automatically adjust the video window based on one or more adjustments to the one or more areas of interest resulting from changes in one or more objects within the field of interest.

In one embodiment, the system includes a masthead, a mast, and a base; wherein the masthead comprises: a first image sensor, a second image sensor, a first lens corresponding with the first image sensor, a second lens corresponding with the second image sensor, where the first image sensor is configured to capture a first video having a first field of view, and the second image sensor is configured to capture a second video having a second field of view, where the first field of view and the second field of view overlap at a center portion of a field of interest, a global positioning system receiver, and one or more orientation sensors; and wherein the base is communicatively coupled to the masthead via one or more datalinks of the mast and includes one or more base processors configured to: determine a position of the masthead, determine an orientation of the masthead relative to the field of interest based on one or more signals received from the one or more orientation sensors, calibrate the first field of view and the second field of view, wherein the calibrating the first field of view and the second field of view comprises: comparing an expected position and orientation to a determined position and orientation and adjusting one or more orientation parameters of the system to match the expected position and orientation, identify one or more areas of interest within the first field of view and the second field of view, record a location and time stamp of one or more objects within the one or more areas of interest, merge the first video and the second video into a merged video, translate a video window based on the translated corresponding position of the one or more objects, wherein the video window displays the one or more areas of interest, and automatically adjust the video window based on one or more adjustments to the one or more areas of interest resulting from changes in one or more objects within the field of interest.

In one embodiment, the system includes a masthead, a mast, and a base; wherein the masthead comprises: a first image sensor, a second image sensor, a first lens corresponding with the first image sensor, a second lens corresponding with the second image sensor, where the first image sensor is configured to capture a first video having a first field of view, and the second image sensor is configured to capture a second video having a second field of view, where the first field of view and the second field of view overlap at a center portion of a field of interest, a global positioning system receiver, one or more orientation sensors, a network interface device, and one or more mast processors; and wherein the base is communicatively coupled to the masthead via one or more datalinks of the mast and includes one or more base processors configured to: generate an adjustable video window configured to automatically adjust based on one or more changes in one or more objects within a merged video formed from the first video and the second video.

In one embodiment, a method for capturing an area of interest in a live event is disclosed. The method comprises: capturing, with a first lens and first image sensor, a first video having a first field of view; capturing, with a second lens and second image sensor, a second video having a second field of view, wherein the first field of view and the second field of view overlap at a center portion of a field of interest; determining a position of the first image sensor and the second images sensor; determining an orientation of the first image sensor and the second image sensor relative to the field of interest; calibrating the first field of view and the second field of view; identifying one or more areas of interest within the first field of view and the second field of view; recording a location and time stamp of one or more objects within the one or more areas of interest; merging the first video and the second video into a merged video; translating a corresponding position of the one or more objects to the merged video; generating a video window based on the translated corresponding position of the one or more objects, wherein the video window displays the one or more areas of interest; and automatically adjusting the video window based on one or more adjustments to the one or more areas of interest resulting from changes in the one or more objects within the field of interest.

BRIEF DESCRIPTION OF THE DRAWINGS

The numerous advantages of the disclosure may be better understood by those skilled in the art by reference to the accompanying figures in which:

FIGS. 1F-1G illustrate simplified block diagram views of a system for covering an area of interest in a live event, in accordance with one or more embodiments of the present disclosure.

DETAILED DESCRIPTION

Reference will now be made in detail to the subject matter disclosed, which is illustrated in the accompanying drawings. Referring generally to FIGS. 1A through 5, a system and method for covering a wide area of interest in a live event are disclosed, in accordance with one or more embodiments of the present disclosure. The embodiments set forth herein are taken to be illustrative rather than limiting. It should be readily apparent to those of ordinary skill in the art that various changes and modifications in form and detail may be made without departing from the spirit and scope of the present disclosure.

Figure 1A:
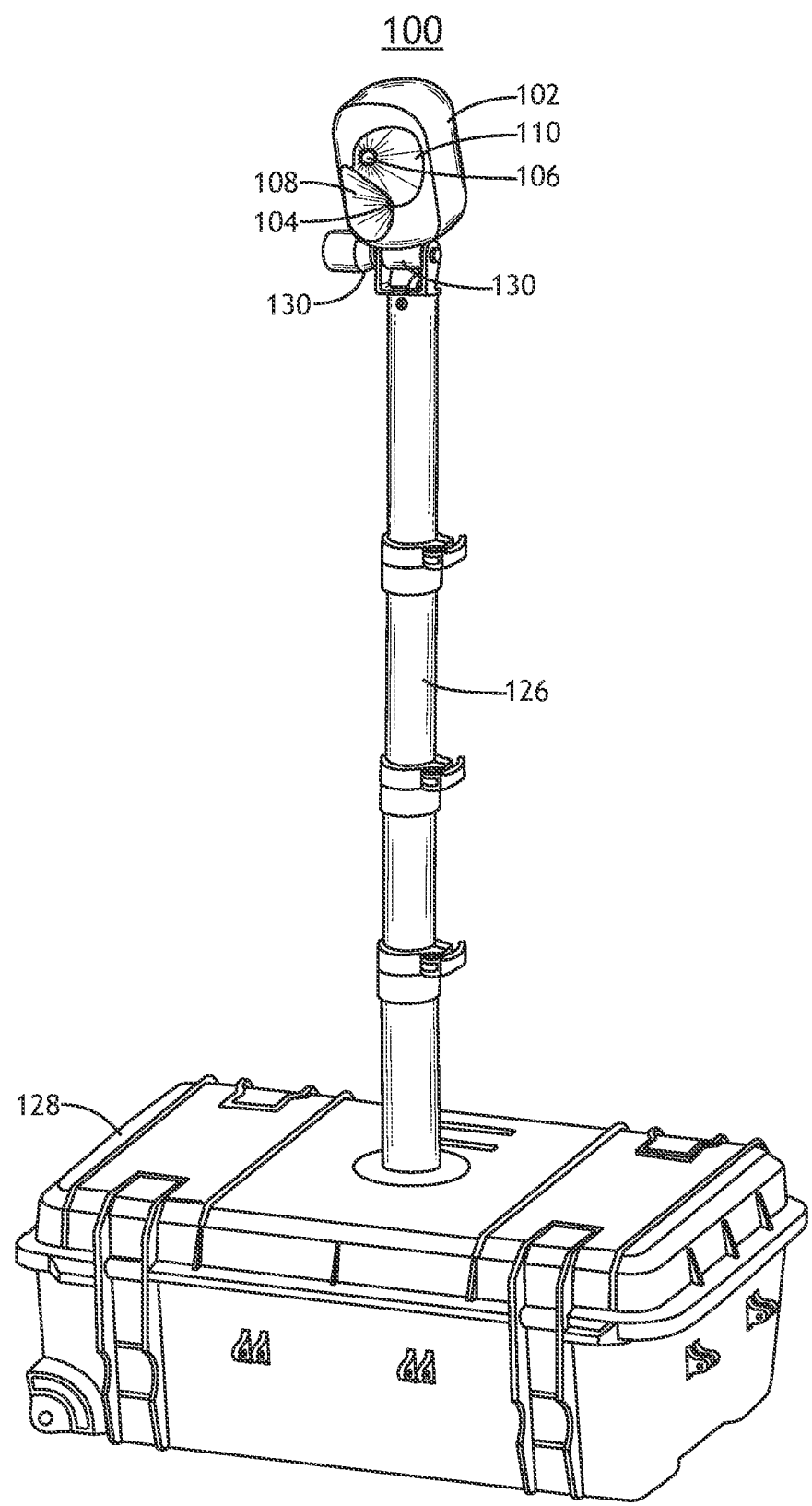
FIGS. 1A through 1C illustrate perspective views of a system for covering an area of interest in a live event, in accordance with one or more embodiments of the present disclosure.

FIG. 1A illustrates a perspective view of a system 100 for covering a wide area of interest in a live event, in accordance with one or more embodiments of the present disclosure. In one embodiment, the system 100 may include a masthead 102, a mast 126, and a base 128.

The masthead 102 may include a first image sensor 104 and a second image sensor 106. Each of the first image sensor 104 and a second image sensor 106 may be configured to capture images of an area (e.g., a football field, a soccer field, etc.). For example, each of the first image sensor 104 and the second image sensor 106 may include a camera. It is noted that the first image sensor 104 and the second image sensor 106 are not a camera and may include any optical device known in the art configured to capture images and/or video.

Figure 1B:
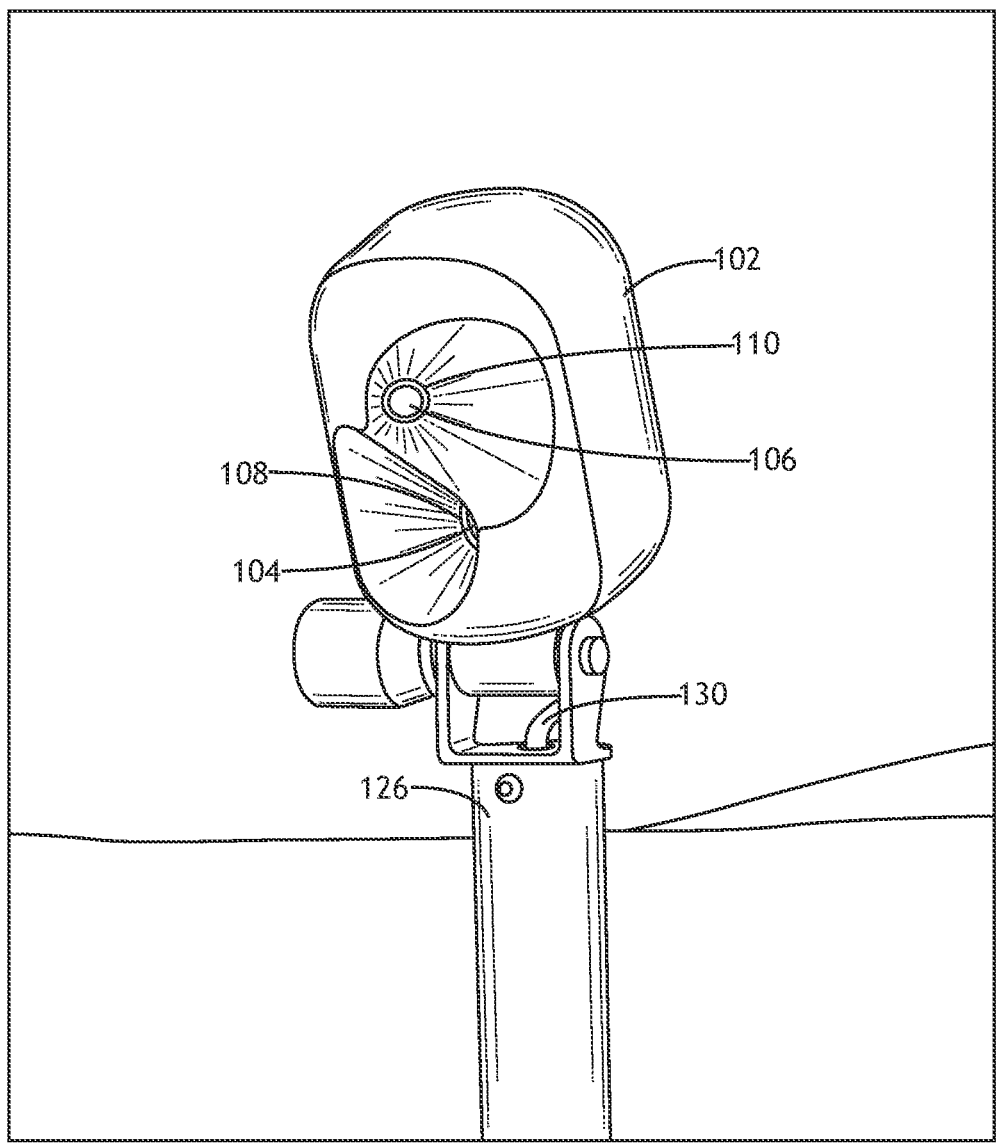
Figure 1C:
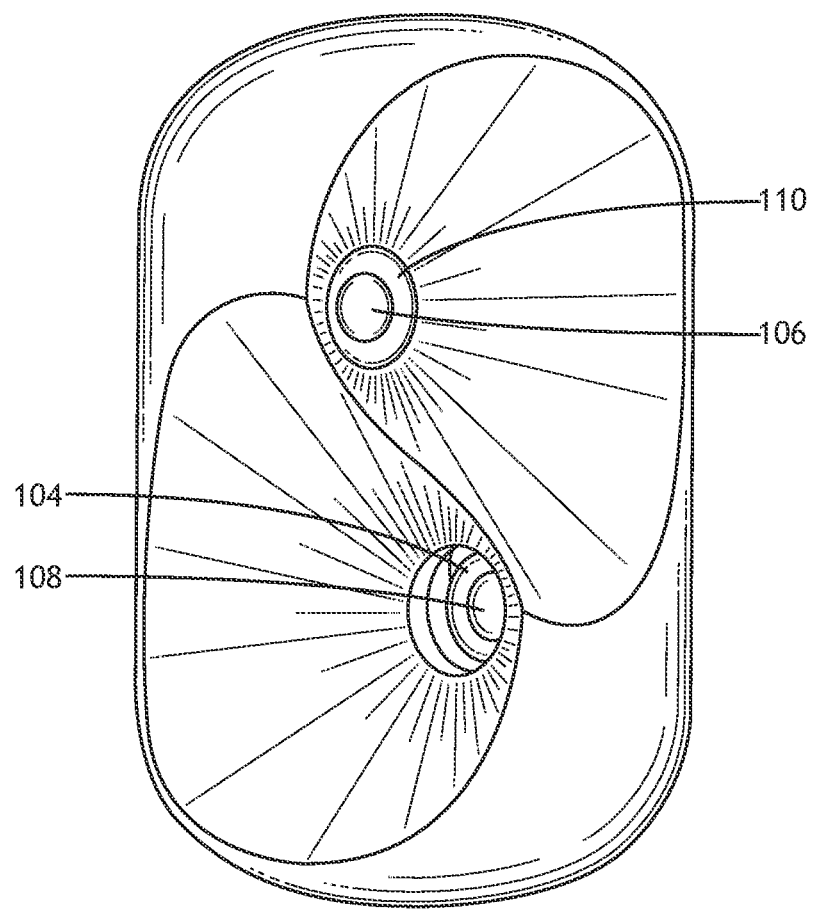

FIGS. 1B and 1C illustrate front perspective views of the masthead 102, in accordance with one or more embodiments of the present disclosure. In one embodiment, the masthead may include a first lens 108 that corresponds with the first image sensor 104 and a second lens 110 that corresponds with the second image sensor 106. In this regard, the first image sensor 104 may images of an area through the first lens 108, while the second image sensor 106 may capture images of an additional area through the second lens 110.

Figure 1D:
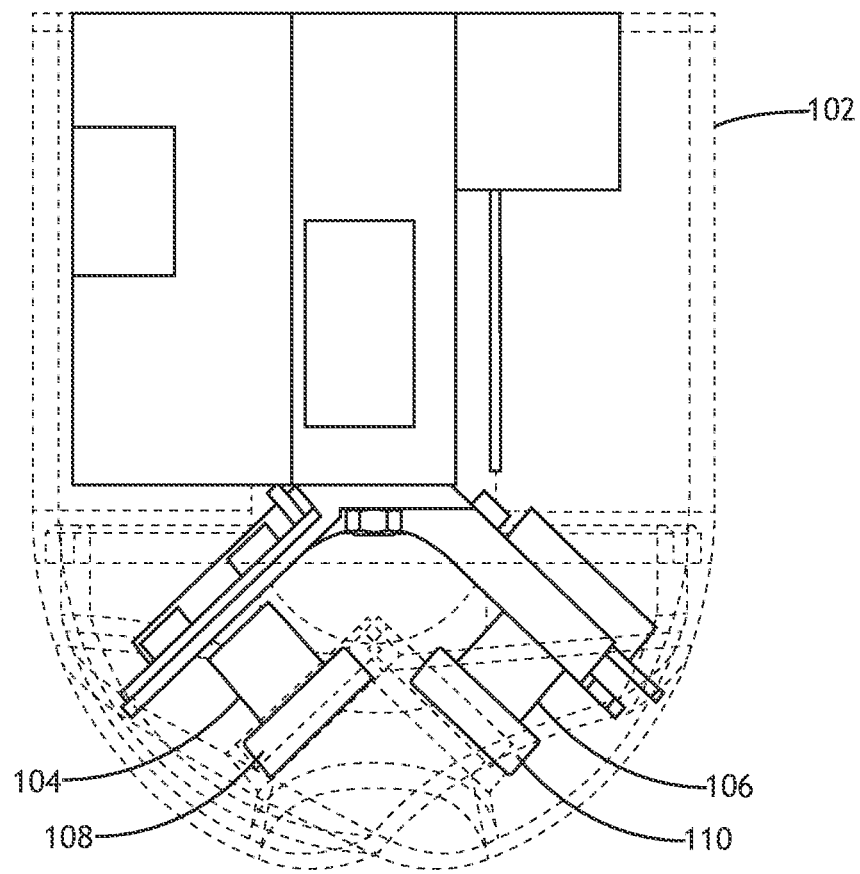
FIG. 1D illustrates a partial, top-down, cross-section view of a system for covering an area of interest in a live event, in accordance with one or more embodiments of the present disclosure.

FIG. 1D illustrates a top-down, cross-section view of the masthead 102, in accordance with one or more embodiments of the present disclosure. The first image sensor 104 and the second image sensor 106 may be positioned within the masthead 102 such that each is configured to capture a different field of view.

Figure 1E:
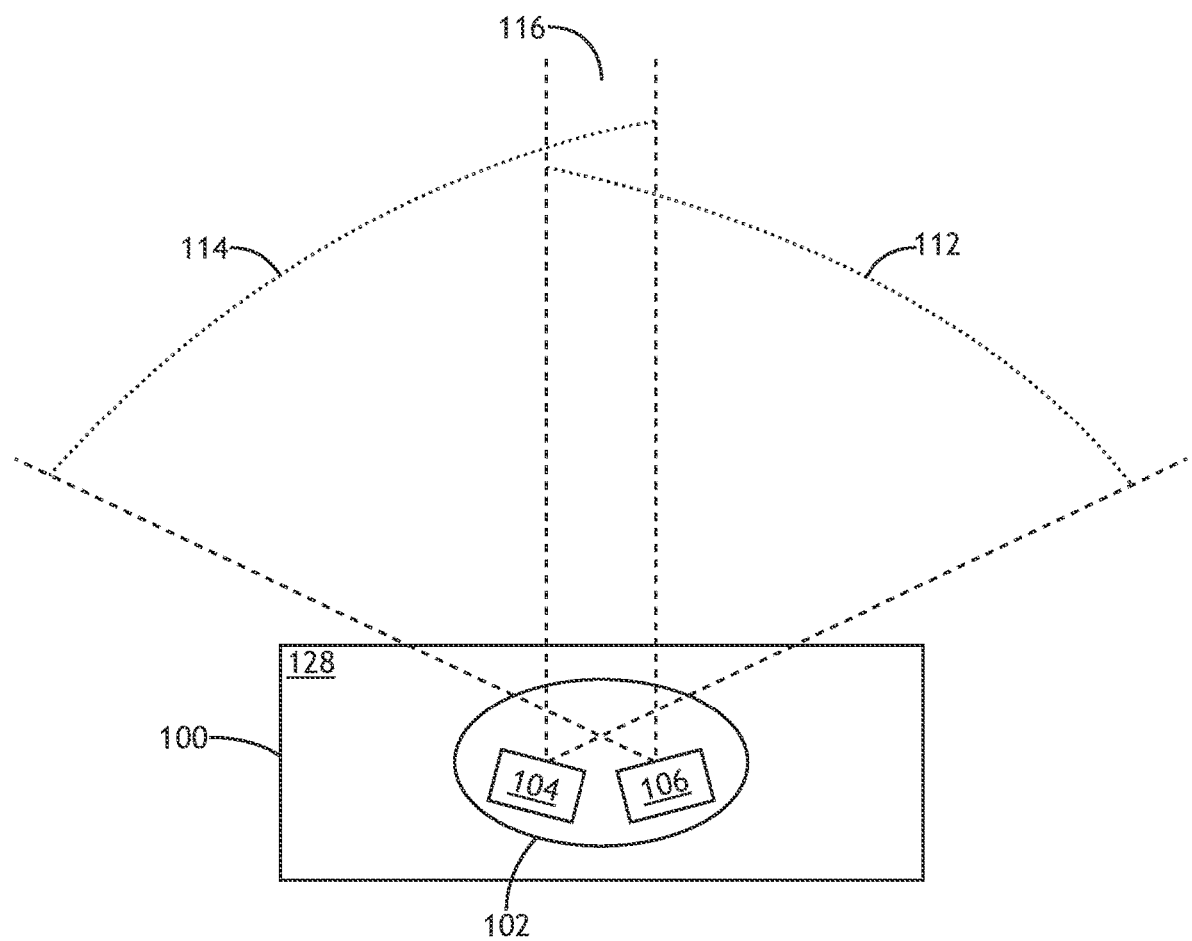
FIG. 1E illustrates a diagrammatic illustration of a one or more operations of a system for covering an area of interest in a live event, in accordance with one or more embodiments of the present disclosure.

As shown in FIG. 1E, the first lens 108 may be configured to cause the first image sensor 104 to have a first field of view 112 of between approximately 90 degrees and approximately 110 degrees. The second lens 110 may be configured to cause the second image sensor 106 to have a second field of view 114 of between approximately 90 degrees and approximately 110 degrees. The first lens 108 and the second lens 110 may be situated within the masthead 102 so that the first field of view 112 and the second field of view 114 overlap at a center portion 134 of a field of interest 116. The first field of view 112 and the second field of view 114 may overlap by between approximately 10% and approximately 30%. The first lens 108 and the second lens 110 may each include a zoom lens. The first lens 108 and the second lens 110 may be configured to capture wide-angle or panoramic video images.

In one embodiment, the masthead 102 may be configured to pan or rotate about a vertical axis y, and tilt about a horizontal axis x, such that the first field of view 112 and the second field of view 114 may be adjusted. For example, the masthead 102 may include an electric motor and/or gimbal unit configured to rotate the masthead along at least one of an x-axis or a y-axis.

Figure 1F:
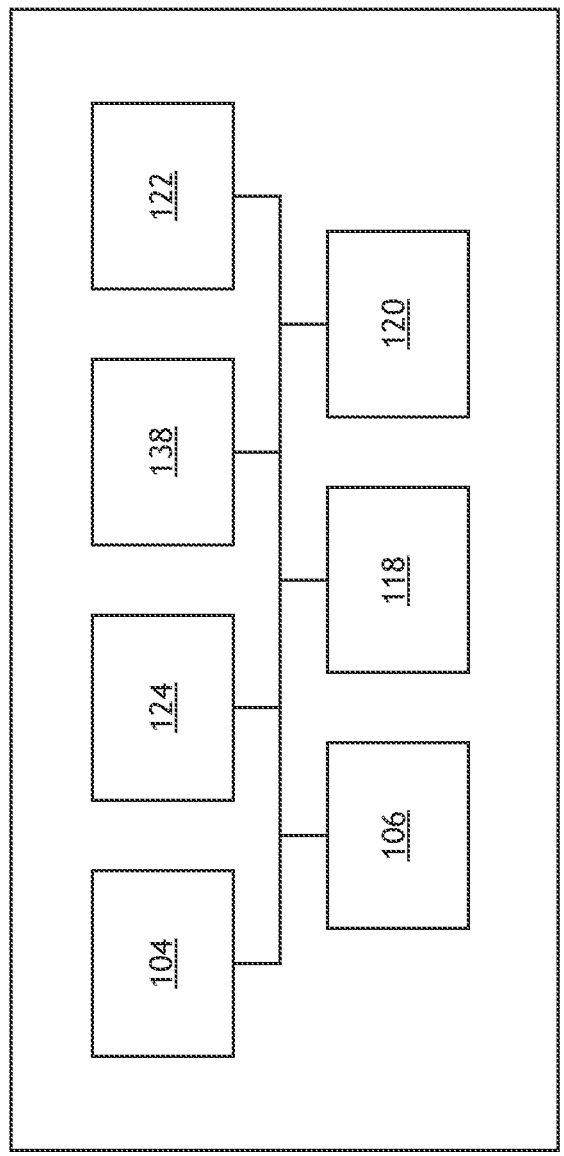

FIG. 1F illustrates a simplified block diagram view of the masthead 102, in accordance with one or more embodiments of the present disclosure. In this embodiment, the masthead 102 may include a printed circuit board or other components (e.g., busline) to communicatively couple the first image sensor 104, the second image sensor 106, one or more mast processors 124, a global positioning system receiver 118, one or more orientation sensors 120, a mast memory unit 138, and/or a network interface device 122. It is noted that the embodiments of the present disclosure are not limited to a printed circuit board or other circuitry, and that the one or more components of the masthead 102 may be communicatively coupled to the various other components of the masthead 102 in any manner known in the art. For example, the components of the masthead 102 may be communicatively coupled via a wireline connection (e.g., copper wire, fiber optic cable, soldered connection, and the like), or a wireless connection (e.g., RF coupling, IR coupling, data network communication, and the like).

The global positioning system receiver 118 may be configured to receive one or more signals from one or more global positioning satellites in earth orbit. In another embodiment, the masthead 102 may be communicatively coupled to an external global positioning system receiver 118.

Referring back to FIG. 1A, the mast 126 of the system 100 may include a telescoping pole configured to extend from the base 128. The mast 126 may include a hollow channel within its interior. In one embodiment, the masthead 102 may be removably coupled to the mast 126 via a latch, clip, twist-lock, or other mechanical means. The masthead 102 may include one or more attachment ports for removably coupling the masthead 102 to the mast 126. For example, the masthead 102 may include an opening into which the mast 126 may be inserted. The masthead 102 may be electrically coupled to one or more portions of the base 128 via a one or more cables that may span the length of the mast 126. One or more portions of the masthead 102 may be communicatively coupled to one or more portions of the base 128 via one or more datalinks of the mast 130. For example, the first image sensor 104 and the second image sensor 106 may be communicatively coupled to one or more portions of the base 128 via the one or more datalinks of the mast 130. The one or more datalinks of the mast may include one or more wireline (e.g., copper wire, fiber optic cable, and the like) or wireless connections (e.g., RF coupling, data network communication, etc.).

The mast 126 may be removably coupled to the base 128 via a latch, clip, twist-lock, or other mechanical means. The base 128 may include one or more attachment ports for removably coupling the mast 126 to the base 128. For example, the base 128 may include an opening into which the mast 126 may be inserted.

The base 128 may include two opposing sides, joined by a hinge, that come together to form a closed space in which the mast 126 may be stored. The base 128 may include two or more wheels to allow mobility. The base may include one or more openings, busses, outlets, inlets, ports, and the like, so as to permit one or more wireline connections between one or more portions of the base 128 and corresponding connections outside of the base 128. For example, the base 128 may include an outlet for connection to a power supply.

FIG. 1G illustrates a simplified block diagram view of the base 128, in accordance with one or more embodiments of the present disclosure. The base 128 may include a printed circuit board or other components (e.g., busline) configured to communicatively couple a power supply 146, one or more base processors 132, a base memory unit 148, and a base network interface device 150. It is noted that the embodiments of the present disclosure are not limited to a printed circuit board or other circuitry, and that the one or more components of the base 128 may be communicatively coupled to the various other components of the base 128 in any manner known in the art. For example, the components of the base 128 may be communicatively coupled via a wireline connection (e.g., copper wire, fiber optic cable, soldered connection, and the like), or a wireless connection (e.g., RF coupling, IR coupling, data network communication, and the like).

Figure 2A:
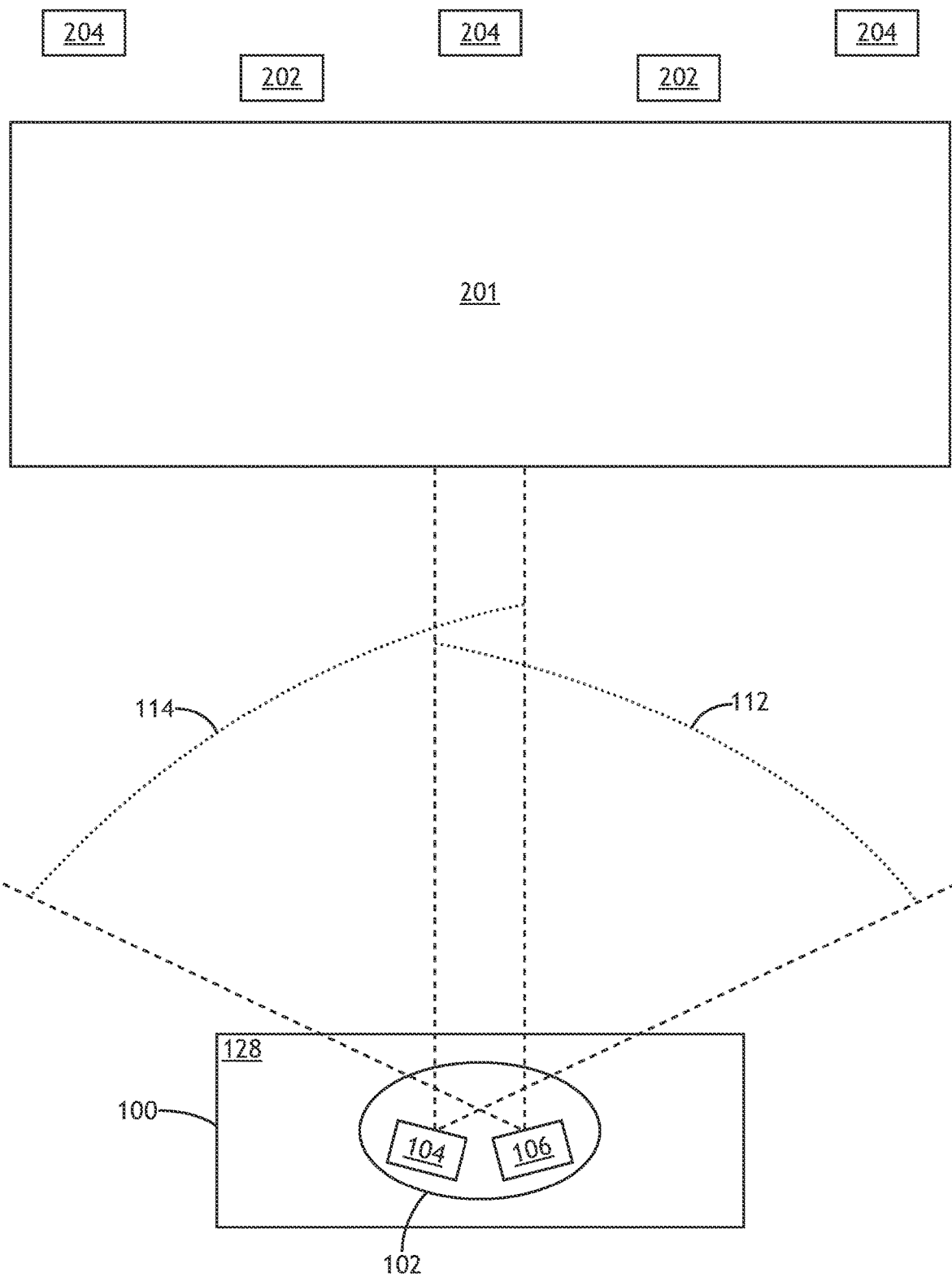
FIGS. 2A through 2C are diagrammatic illustrations of one or more operations of a system for covering an area of interest in a live event, in accordance with one or more embodiments of the present disclosure.

FIG. 2A illustrates a conceptual view of system 100 in operation, in accordance with one or more embodiments of the present disclosure. The system 100 may be positioned on or near a playing field 201. The playing field 201 may include, for example, a football field, a baseball field, a soccer field, and the like. The playing field 201 may include the field of interest 116. The system 100 may be positioned at a location on or near the playing field 201 from which a maximum area of the playing field 201 may be captured by the first image sensor 104 and the second image sensor 106, respectively, while each of the first image sensor 104 and the second image sensor 106 captures at least a portion of the field of interest 116. For example, the system 100 may be positioned on or near the playing field 201 such that the first image sensor 104 may capture a first video 113 of the first field of view 112, and such that the second image sensor 106 may capture a second video 115 of the second field of view 114. In the foregoing example, the first field of view 112 may overlap with the second field of view 114 at a center portion 134 of the field of interest 116, by approximately 10 percent to approximately 30 percent of the area of either the first field of view 112 or the second field of view 114.

In one embodiment, the one or more base processors 132 are configured to determine a position of the masthead 102. For example, the one or more base processors 132 may determine a position of the masthead 102 based on one or more signals from one or more cellular towers 202 and/or one or more global positioning system satellites 204. The one or more base processors 132 may store location data (e.g., coordinates) of one or more playing fields 201, and the one or more base processors 132 may be configured to retrieve such data for comparison against the determined position. Alternatively, a remote server may store location data related to one or more playing fields 201, which data may be retrieved by the one or more base processors 132 for comparison against the determined position. The one or more base processors 132 may be configured such that the queries of stored location data produce results only if the determined position of the masthead 102 falls within an error threshold of the stored location data. The stored location data may include, but is not limited to, data related to the particular playing field 201, such as the expected characteristics of the playing field 201 (e.g., field line configuration), expected size of the playing field 201, and the like.

In another embodiment, the one or more base processors 132 are configured to determine an orientation (e.g., cardinal orientation) of the first image sensor 104 and the second image sensor 106. For example, the one or more base processors 132 may, based on one or more signals from the one or more orientation sensors 120, determine the orientation of the first image sensor 104 and the second image sensor 106 relative to the field of interest 116. The one or more orientation sensors 120 may be configured to measure one or more signals indicative of whether the first image sensor 104 and the second image sensor 106 are oriented such that the field of interest 116, first field of view 112, and the second field of view 114 may be captured. The one or more orientation sensors 120 may include, but are not limited to, accelerometers, magnetometers, and gyroscopes.

In another embodiment, upon determination of a position and orientation of the masthead 102, the one or more base processors 132 are configured to calibrate the first field of view 112, the second field of view 114, or both. For example, the one or more base processors 132 may calibrate the first field of view 112, the second field of view 114, or both, by comparing the determined position and orientation to an expected position and orientation, and then by determining and making one or more adjustments to one or more orientation parameters (e.g., orientation or position) of the system 100, such that the position and orientation of the masthead 102 correspond to the expected position and orientation. The expected position and orientation with respect to a particular field of interest 116 may be stored in local memory or in a remote server. The expected position and orientation may be provided by user input. The expected position and orientation may be determined based on one or more signals from the global positioning system receiver 118.

The one or more base processors 132 may be configured to compare the determined position and orientation to an expected position and orientation, and determine whether the determined position and orientation fall within an error threshold of the expected position and orientation. For example, the one or more base processors 132 may compare the determined position and orientation to an expected position and orientation, and determine that one or more adjustments to one or more orientation parameters are necessary based on whether the determined position and orientation fall within the error threshold. The one or more base processors 132 may determine the one or more adjustments to the one or more orientation parameters such that the position and orientation of the masthead 102, upon making one or more adjustments to the one or more orientation parameters, fall within the error threshold of the expected position and orientation.

The system 100 may make one or more adjustments to the orientation parameters of the system 100. For example, the system 100 may make one or more adjustments by panning and/or tilting the masthead. The system 100 may be configured to alert a user (e.g., send a notification to a user device) of its determination of one or more adjustments to the orientation parameters of the system 100 so that the user may make the one or more adjustments. The system 100 may be configured to require a user to approve the one or more adjustments.

Figure 2B:
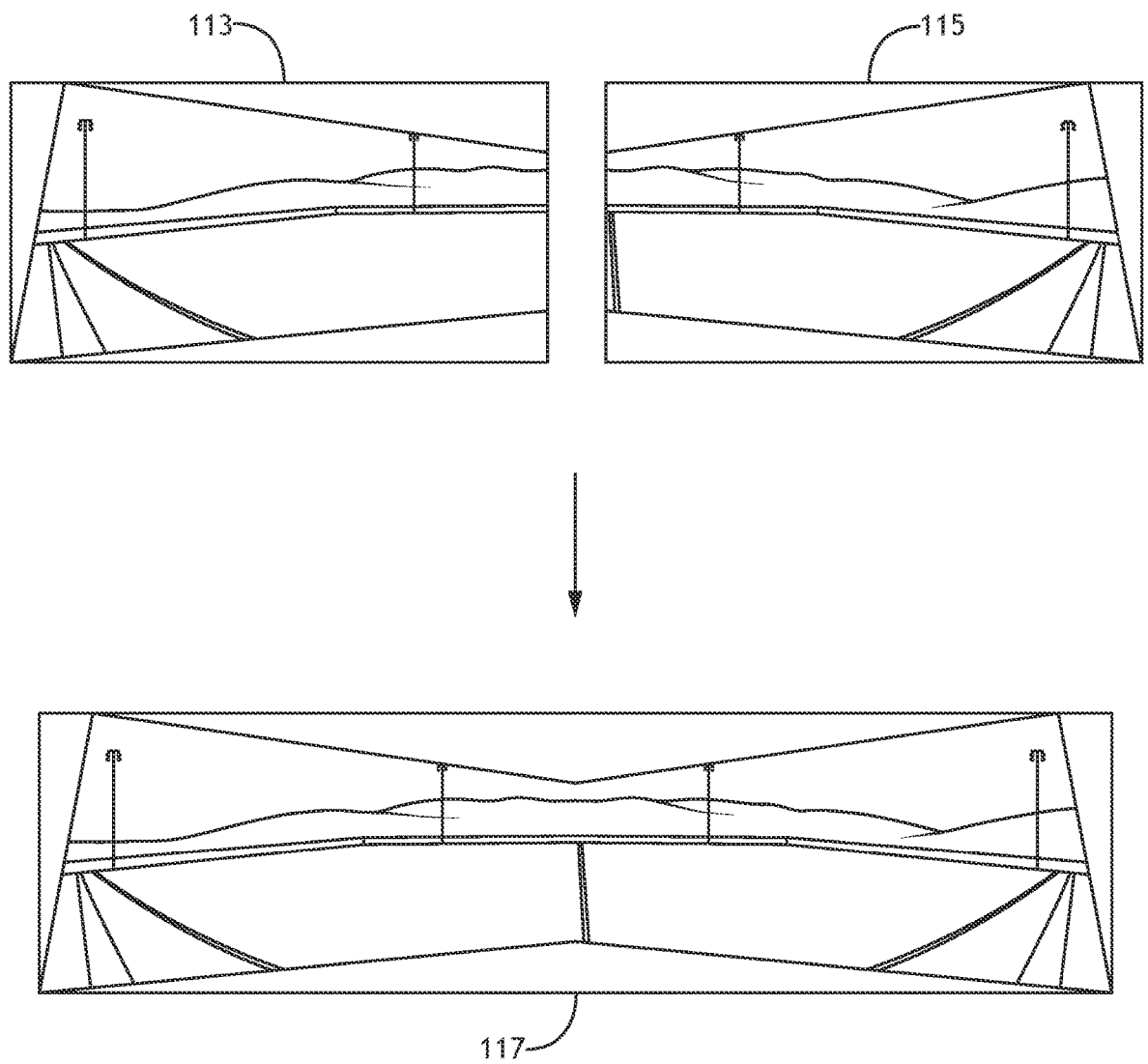

In another embodiment, as shown in FIG. 2B, the one or more base processors 132 are configured to merge the first video 113 with the second video 115 to form a merged video 117. For example, the one or more base processors 132 may be configured to merge the first video 113 and the second video 115 into a merged video 117 that shows both the first video 113 and the second video 115 simultaneously, where the first video 113 and the second video 115 are joined together at a common location of the playing field 201 that is within both the first field of view 112 and the second field of view 114, such that the merged video 117 appears to a viewer to be a single video. The merged video 117 may be a butterfly-type video, where the butterfly-type video is configured to display the entirety of both the first field of view 112 and the second field of view 114. The one or more base processors 132 may be configured to merge the first video 113 with the second video 115 in real time or near-real time. For example, as the first video 113 and the second video 115 are captured, the one or more base processors 132 may continuously merge the first video 113 and the second video 115 such that a merged video 117 is produced as the first video 113 and the second video 115 are captured.

In another embodiment, the one or more base processors 132 are configured to the determine one or more location identifiers (e.g., field line, field boundary, player, ball, etc.) within at least one of the first field of view 112 and the second field of view 114. For example, the first image sensor 104 and the second image sensor 106 may capture one or more images of a location identifier, such as a field line, a field boundary, a ball, a player, or any other object. The one or more base processors 132 may determine one or more location identifiers based on the one or more images. The determination of one or more location identifiers may include the system 100 using one or more object recognition algorithms to identify only objects that match, within an error threshold, the size, the shape or other characteristic of an expected location identifier. For example, the one or more base processors 132 may determine a field boundary based on one or more characteristics of the field boundary detectable by the one or more base processors 132, where the characteristics detectable by the system 100 correspond, within an error threshold, to one or more expected characteristics. The expected characteristics of a location identifier may be stored in the mast memory unit 138 or a remote server. The expected characteristics of a location identifier may be provided by a user. In some embodiments, the system 100 is configured to pan and/or tilt the masthead 102 in order to determine one or more location identifiers.

In another embodiment, upon determination of one or more location identifiers, the one or more base processors 132 are configured to determine the distance between the location identifier and the system 100. For example, the one or more base processors 132 may determine the distance between the location identifier and the system 100 by determining the ratio between the size of the location identifier, as captured by the system 100, and the expected size of the location identifier based on data stored in local memory or a remote server.

In another embodiment, the one or more base processors 132 are configured to record data about the position of an object and the time at which the object was in a particular location in order to facilitate the merger of the first video 113 and the second video 115 into the merged video 117. For example, the one or more base processors 132 may be configured to record a time stamp on both the first video 113 and the second video 115, such that the system 100 may associate a particular portion of the first video 113 with a particular portion of the second video 115. The one or more base processors 132 may associate a portion of the first video 113 bearing a particular timestamp with a portion of the second video 115 bearing the same timestamp for purposes of merging the first video 113 with the second video 115.

Figure 2C:
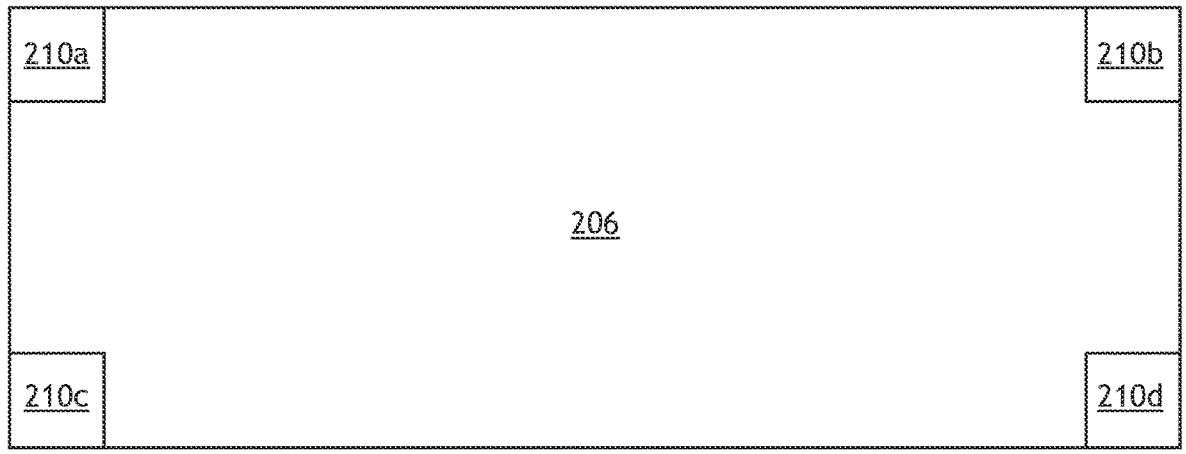
Figure 2C:
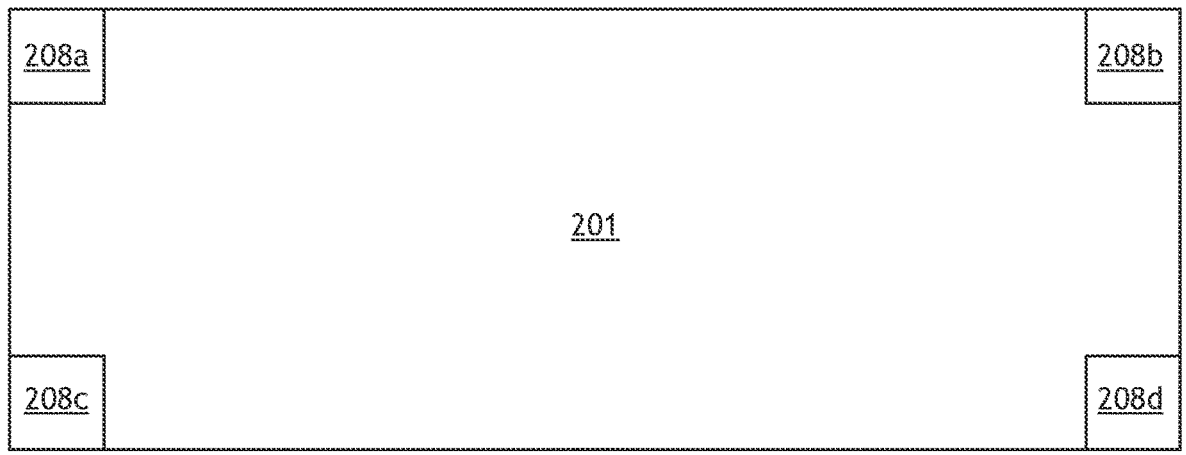

In another embodiment, as illustrated in FIG. 2C, the one or more base processors 132 are configured to translate the position of one or more objects on the playing field 201 to a virtual playing field 206 that corresponds to the playing field 201 as it appears in the merged video 117. The virtual playing field 206 may include a virtual representation of the playing field 201 in a virtual 3D coordinate space.

In another embodiment, the one or more base processors 132 use data stored in local memory or in a remote server to translate the position of one or more objects to the virtual playing field 206. In another embodiment, one or more portions of the data used to setup the virtual playing field 206 may be provided by an input by a user. For example, a user of the system 100 may provide an input to the system 100 specifying that the sport to be captured is football, and the system 100 may retrieve data related to one or more objects expected on a football field.

In another embodiment, the one or more base processors 132, based on the determined distance between a particular location identifier and the system 100, identify a corresponding position of another object. For example, as illustrated in FIG. 2C, based on the determined distance between the system 100 and a corner point 208*a* of the playing field 201, the one or more base processors 132 may identify a corresponding position of the corner point 208*a* on the virtual playing field 206, such as position 210*a*. In this regard, the one or more base processors 132 may be configured to translate the position of one or more location identifiers on the playing field 201 to one or more corresponding positions on the virtual playing field 206.

In another embodiment, the one or more base processors 132 are configured to determine, based on the position of the determined location card and data stored in local memory or a remote server, the expected corresponding position of one or more additional objects on the virtual playing field 206. For example, the one or more base processors 132, based on stored data specifying the expected distance between the corner point 208*a* to the other corner points 208*b*, 208*c*, and 208*d* of the playing field 201, may determine expected corresponding positions of the remaining corner points 210*b*, 210*c*, and 210*d* on the virtual playing field 206. In another embodiment, a user may input data related to the expected corresponding position of the one or more additional objects.

In another embodiment, the one or more base processors 132 are configured to identify one or more areas of interest 212 within the first field of view 112, the second field of view 114, or both. The one or more base processors 132 may identify the one or more areas of interest 212 based on data stored in local memory, on a remote server, or user input. For example, the one or more base processors 132 may identify a goalpost as an area of interest 212 based on data indicating that the sport being played is football. The one or more areas of interest 212 may include, but are not limited to, areas of the field, the position of one or more players, balls, officials, and the like. The one or more base processors 132 may be configured to rank one or more areas of interest 212 based on a set of rules that specify a priority order. The priority order of one or more areas of interest 212 may vary with the sport being played, the particular playing field 201, and the like. For example, if the sport being played is football, one or more areas of interest 212 in which the football may appear may be given a higher priority than an area of interest 212 in which a field boundary may appear.

In another embodiment, the one or more base processors 132 are configured to identify the one or more areas of interest 212 based on the expected position of one or more objects. For example, the one or more base processors 132 may be configured to identify one or more areas of interest by tracking the movement of a ball, and identifying one or more areas of interest based on the expected future location of the ball. The one or more base processors 132 may track the movement of one or more objects and determine one or more expected future locations of the one or more objects by, for example, calculating the velocity and trajectory of the one or more objects.

in another embodiment, the system 100 may be configured to automatically (e.g., without user input) pan and/or tilt the masthead 102 as an object moves from one location to another location. For example, the one or more base processors 132 may be configured to automatically determine one or more pan and/or tilt adjustments to the masthead 102, and automatically cause the system 100 to execute such one or more adjustments. As the system 100 may automatically pan and/or tilt the masthead 102 as the object moves from one location to another, the one or more base processors 132 may be configured to automatically determine one or more adjustments to the image capture settings of the first image sensor 104 and/or the second image sensor 106, and automatically cause the system 100 to execute such one or more adjustments. For example, the one or more base processors 132 may automatically determine one or more adjustments to the zoom level of the first lens 108 and/or the second lens 100, and the one or more base processors 132 may cause the system 100 to execute such one or more adjustments. The one or more base processors may automatically determine one or more adjustments to the image capture settings of the first image sensor 104 and/or the second image sensor 106 based on data stored in local memory or on a remote server that is specific to a particular area of interest 212. For example, the one or more base processors 132 may be configured to automatically determine one or more adjustments to the image capture settings of the first image sensor 104 and/or the second image sensor 106 upon identification of a particular area of interest 212 or upon the entrance of one or more objects into a particular area of interest 212. In some embodiments, a user of the system 100 may input image capture settings for a particular area of interest 212.

In another embodiment, upon identification of one or more areas of interest 212, the one or more base processors 132 are configured to generate a video window that may display the one or more areas of interest 212. For example, the video window may display an area of interest 212 in which a particular player may appear. The one or more base processors 132 may be configured to automatically determine and make one or more adjustments to the video window based on one or more changes to one or more objects within the one or more areas of interest 212. For example, as a particular player moves about a field, the one or more base processors 132 may automatically determine and make one or more adjustments to the video window so that the particular player is shown continuously within the video window.

In another embodiment, the one or more base processors 132 may be configured to generate a warped video window that displays the one or more areas of interest 212. For example, the warped video window may include video images captured through a first lens 108 or a second lens 110 that is configured to capture wide-angle or panoramic video images.

In another embodiment, the one or more base processors 132 may be configured to generate a dewarped video window that displays one or more areas of interest 212. For example, the dewarped video window may include video images captured through a first lens 108 or a second lens 110 that is configured to capture rectilinear video images, and not wide-angle panoramic video images. Alternatively, the dewarped video window may include video images captured through a first lens 108 or a second lens 110 that is configured to capture wide-angle or panoramic video images, where the video images may be digitally processed by the system 100 or a remote system to produce rectilinear video images.

In another embodiment, the system 100 may be configured to deliver the video window to a remote server via a network. For example, the system 100 may transmit the video window via at least one of the network interface device 122 or the base network interface device 150 to a server configured to display the video window to one or more user devices (e.g., computer, tablet, television, etc.).

The one or more mast processors 124 and the one or more base processors 132 may each include any one or more processing elements known in the art. In general, the term processor may be broadly defined to encompass any device having one or more processing elements, which execute program instructions from a non-transitory medium (i.e., memory). In one embodiment, the one or more mast processors 124 and the one or more base processors 132 may each include any microprocessor-type computational device configured to execute software algorithms and/or instructions. In general, the term processor may be broadly defined to encompass any device having data processing or logic capabilities. It should be recognized that the steps described throughout the present disclosure may be carried out by a single processor or multiple processors.

The mast memory unit 138 and the base memory unit 148 may each include a memory unit or storage medium known in the art to be suitable for the storage of program instructions executable by a processor. For example, the mast memory unit 138 and the base memory unit 148 may each include a non-transitory memory medium. For instance, the mast memory unit 138 and the base memory unit 148 may include, but are not limited to, a read-only memory (ROM), a random access memory (RAM), a magnetic or optical memory device, a magnetic tape, a solid-state drive, and the like. In an alternative embodiment, the mast memory unit 138 and the base memory unit 148 may each maintain program instructions for causing one or more processors to carry out the various steps described in the present disclosure.

The network interface device 122 and the base network interface device 150 may each include any wireline-based interface device (e.g., DSL-based interconnection, cable-based connection, T9-based interconnection, and the like). In another instance, the network interface device 122 and the base network interface device 150 may each include a wireless-based interface device employing GSM, GPRS, CDMA, EV-DO, EDGE, WiMAX, 3G, 4G, LTE, 5G, 6G, Wi-Fi protocols, and the like.

The power supply 146 may include AC or DC electric power supply, including, without limitation, any rechargeable or non-rechargeable battery known in the art. For example, the battery 146 may include a lithium-ion battery.

Figure 3:
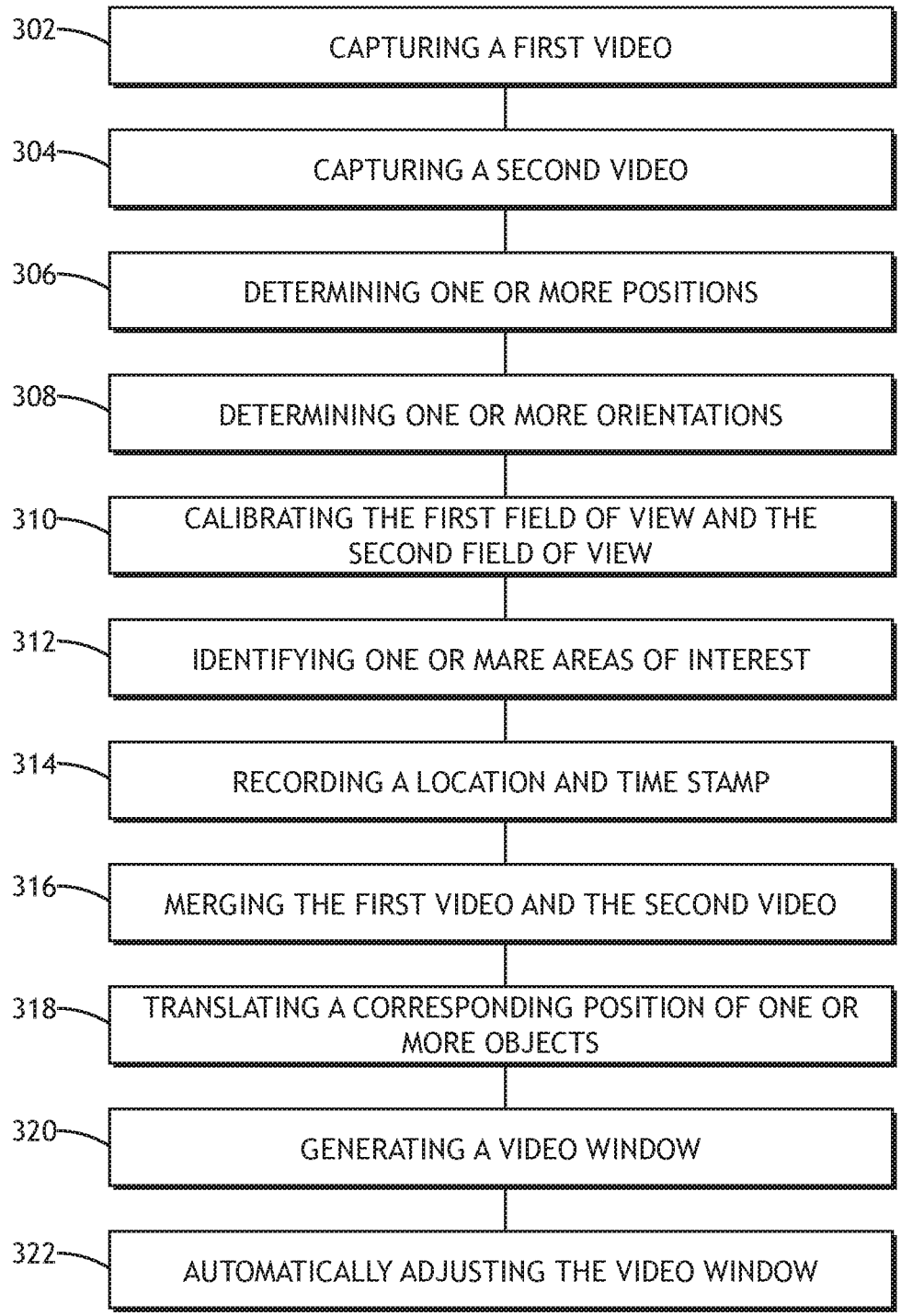
FIG. 3 illustrates a process flow diagram illustrating a method of covering an area of interest in a live event, in accordance with one or more embodiments of the present disclosure.

FIG. 3 illustrates a process flow diagram for a method 300 of capturing an area of interest in a live event, in accordance with one or more embodiments of the present disclosure.

In step 302, a first video 113 is captured. For example, the first image sensor 104, corresponding to a first lens 108, may capture the first video 113 having the first field of view 112.

In step 304, a second video 115 is captured. For example, the second image sensor 106, corresponding to a second lens 110, may capture the second video 115 having the second field of view 114.

In step 306, one or more positions are determined. For example, the position of the first image sensor 104 and the second image sensor 106 may be determined by the system 100 based on one or more signals received from the global positioning system receiver 118. As an additional example, the position of the first image sensor 104 and the second image sensor 106 may be determined by the system 100 based on one or more signals received from the one or more cellular towers 202.

In step 308, one or more orientations are determined. For example, the orientation of the first image sensor 104 and the second image sensor 106 relative to the field of interest 116 may be determined by the system 100 based on one or more signals received from the one or more orientation sensors 120.

In step 310, the first field of view 112 and the second field of view 114 are calibrated. For example, the system 100 may calibrate the first field of view 112, the second field of view 114 by comparing the determined position and orientation to an expected position and orientation, and then by determining and making one or more adjustments to one or more orientation parameters (e.g., orientation or position) of the system 100, such that the position and orientation of the system 100 correspond to the expected position and orientation.

In step 312, one or more areas of interest 212 are identified. For example, the system 100 may be configured to identify one or more areas of interest 212 within the first field of view 112, the second field of view 114, or both. The system 100 may identify the one or more areas of interest 212 based on data stored in local memory, on a remote server, or user input. For example, the system 100 may identify a goalpost as an area of interest 212 based on data indicating that the sport being played is football.

In step 314, a location and a timestamp are recorded. For example, the system may be configured to record a time stamp on both the first video 113 and the second video 115.

In step 316, the first video 113 and the second video 115 are merged. For example, the system 100 may be configured to merge the first video 113 and the second video 115 into a merged video 117 that shows both the first video 113 and the second video 115 simultaneously, where the first video 113 and the second video 115 are joined together at a common location of the playing field 201 that is within both the first field of view 112 and the second field of view 114, such that the merged video 117 appears to a viewer to be a single video.

In step 318, the corresponding position of one or more objects is translated to the merged video 117. For example, the system 100 may translate the position of one or more objects on the playing field 201 to one or more corresponding positions on the virtual playing field 206, where the virtual playing field 206 corresponds to the playing field 201 as it appears in the merged video 117.

In step 320, the video window is generated. For example, the video window may display one or more areas of interest 212.

In step 322, the video window is automatically adjusted. For example, the system 100 may automatically adjust the video window based on one or more changes to one or more objects within the one or more areas of interest 212.

Figure 4:
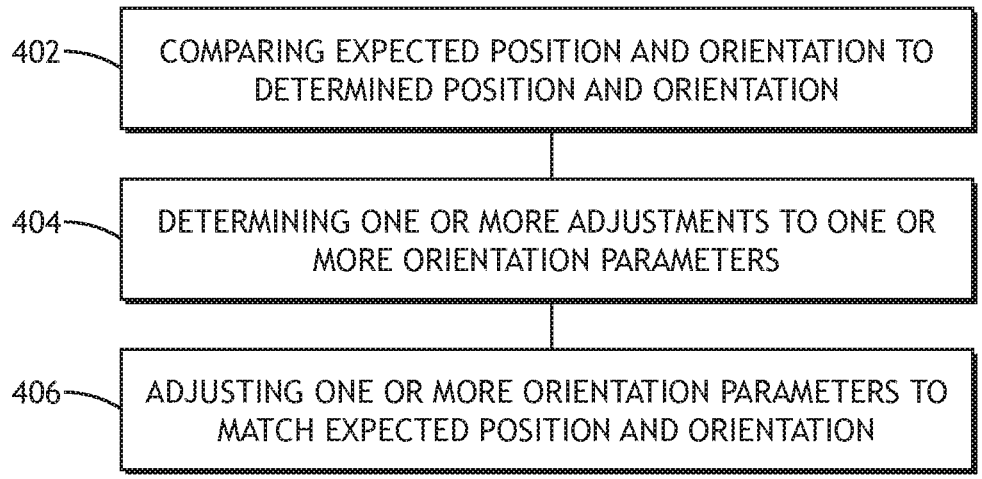
FIG. 4 illustrates a process flow diagram illustrating a method of calibrating one or more portions of a system for covering an area of interest in a live event, in accordance with one or more embodiments of the present disclosure.

FIG. 4 illustrates a process flow diagram for a method 400 of calibrating the first field of view 112 and the second field of view 114 in accordance with one or more embodiments of the present disclosure.

In step 402, the expected position and orientation of the system 100 are compared to a determined position and orientation. For example, the system 100 may compare a position that it determined based on one or more signals from the global positioning system receiver 118 to an expected position that is stored in a local memory unit. As an additional example, the system 100 may compare an orientation that it determined based on one or more signals from the one or more orientation sensors 120 to an expected orientation provided to the system 100 by user input.

In step 404, one or more adjustments to one or more orientation parameters of the system 100 are determined. For example, the one or more base processors 132 may determine one or more adjustments to the orientation parameters of the system 100 based on the comparison of the expected position and orientation of the system 100 to the determined position and orientation.

In step 406, one or more orientation parameters of the system 100 are adjusted to match the expected position and orientation. For example, the system 100 may pan and/or tilt the masthead to adjust the first field of view 112 and the second field of view 114 such that the position and orientation of the system match the expected position and orientation. As an additional example, the system 100 may alert a user of the determined one or more adjustments to the one or more orientation parameters, enabling the user to make the one or more adjustments.

Figure 5:
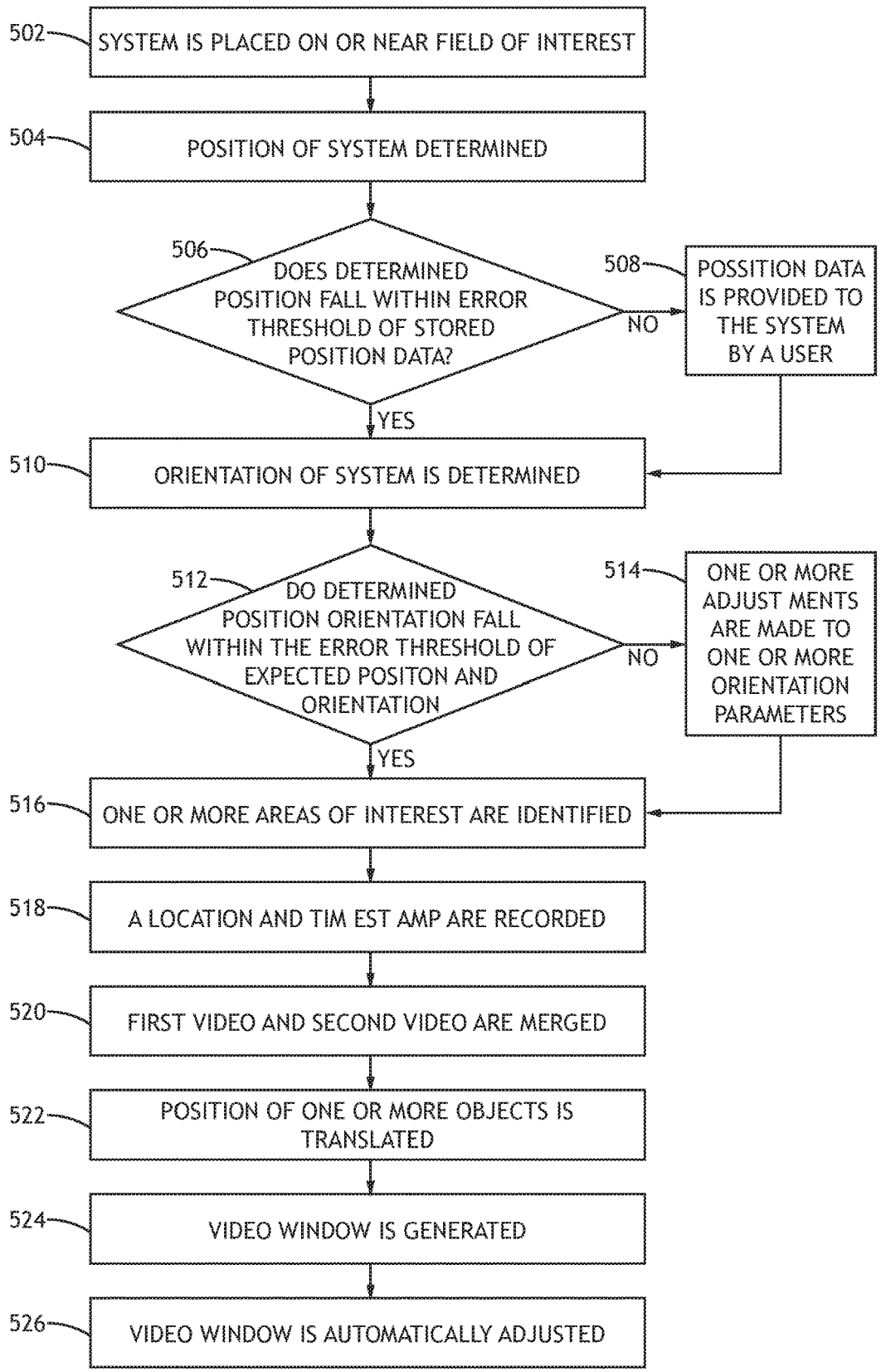
FIG. 5 illustrates a process flow diagram illustrating a method of covering an area of interest in a live event, in accordance with one or more embodiments of the present disclosure.

FIG. 5 illustrates a process flow diagram for a method 500 of capturing an area of interest in a live event, in accordance with one or more embodiments of the present disclosure.

In step 502, the system 100 is placed on or near a field of interest 116. For example, the system 100 may be placed on the sideline of a football field.

In step 504, one or more positions of the system 100 are determined. For example, the position of the first image sensor 104 and the second image sensor 106 may be determined by the system 100 based on one or more signals received from the global positioning system receiver 118. As an additional example, the position of the first image sensor 104 and the second image sensor 106 may be determined by the system 100 based on one or more signals received from the one or more cellular towers 202.

In step 508, if the determined position does not fall within an error threshold of stored position data ("NO" at step 506), position data is provided to the system 100 by a user. Upon provision of position data by a user, the method 500 continues to step 510. Alternatively, if the determined position does fall within the error threshold of stored position data ("YES" at step 506), the method 500 bypasses step 508 and continues to step 510.

In step 510, one or more orientations are determined. For example, the orientation of the first image sensor 104 and the second image sensor 106 relative to the field of interest 116 may be determined by the system 100 based on one or more signals received from the one or more orientation sensors 120.

In step 514, if the one or more determined positions and one or more determined orientations do not fall within an error threshold of the expected position and the expected orientation ("NO" at step 512), one or more adjustments are made to one or more orientation parameters of the system 100. Upon the making of one or more adjustments to one or more orientation parameters, the method 500 continues to step 516. Alternatively, if the one or more determined positions and one or more determined orientations do fall within an error threshold of the expected position and the expected orientation ("YES" at step 512), the method 500 bypasses step 514 and continues to step 516.

In step 516, one or more areas of interest 212 are identified. For example, the system 100 may be configured to identify one or more areas of interest 212 within the first field of view 112, the second field of view 114, or both. The system 100 may identify the one or more areas of interest 212 based on data stored in local memory, on a remote server, or user input. For example, the system 100 may identify a goalpost as an area of interest 212 based on data indicating that the sport being played is football.

In step 518, a location and a timestamp are recorded. For example, the system may be configured to record a time stamp on both the first video 113 and the second video 115.

In step 520, the first video 113 and the second video 115 are merged. For example, the system 100 may be configured to merge the first video 113 and the second video 115 into a merged video 117 that shows both the first video 113 and the second video 115 simultaneously, where the first video 113 and the second video 115 are joined together at a common location of the playing field 201 that is within both the first field of view 112 and the second field of view 114, such that the merged video 117 appears to a viewer to be a single video. Upon merger of the first video 113 and the second video 115 into the merged video 117, the overlapping portion of each of the first video 113 and the second video 115 are discarded by the system 100, and replaced with the merged video 117. The remaining portion of each of the first video 113 and the second video 115 is each subsequently attached to the merged video 117 such that the merged video displays the entirety of the viewing area constituting the first field of view 112 and the second field of view 114.

In step 522, the corresponding position of one or more objects is translated to the merged video 117. For example, the system 100 may translate the position of one or more objects on the playing field 201 to one or more corresponding positions on the virtual playing field 206, where the virtual playing field 206 corresponds to the playing field 201 as it appears in the merged video 117.

In step 524, the video window is generated. For example, the video window may display one or more areas of interest 212. In step 526, the video window is automatically adjusted. For example, the system 100 may automatically adjust the video window based on one or more changes to one or more objects within the one or more areas of interest 212. It is noted that the embodiments of the present disclosure are not limited to the implementation of the system 100 in sporting events, and it is contemplated that the embodiments of the present disclosure may be implemented in other situations. For example, the system 100 may be implemented in any physical setting.

Different features, variations, and multiple different embodiments have been shown and described with various details. What has been described in this application, at times, in terms of specific embodiments, is done for illustrative purposes only and without the intent to limit or suggest that what has been conceived is only one particular embodiment or specific embodiments. It is to be understood that this disclosure is not limited to any single specific embodiment or enumerated variation. Many modifications, variations, and other embodiments will come to the mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art, and in reliance upon the complete disclosure present at the time of filing.

The invention claimed is:

1. A system comprising:
   a masthead, wherein the masthead comprises:
      a first image sensor and a second image sensor;
      a first lens corresponding with the first image sensor and a second lens corresponding with the second image sensor, wherein the first image sensor is configured to capture a first video having a first field of view and the second image sensor is configured to capture a second video having a second field of view, wherein the first field of view and the second field of view overlap at a center portion of a field of interest;
      a global positioning system receiver; and
      one or more orientation sensors,
   a mast; and
   a base, wherein the base is communicatively coupled to the masthead via one or more datalinks of the mast, wherein the base includes one or more base processors, wherein the one or more base processors are configured to:
      determine a position of the masthead;
      determine an orientation of the masthead relative to the field of interest based on one or more signals received from the one or more orientation sensors;

calibrate the first field of view and the second field of view;

identify one or more areas of interest within the first field of view and the second field of view;

record a location and time stamp of one or more objects within the one or more areas of interest;

merge the first video and the second video into a merged video;

translate a corresponding position of the one or more objects to the merged video;

generate a video window based on the translated corresponding position of the one or more objects, wherein the video window displays the one or more areas of interest; and automatically adjust the video window based on one or more adjustments to the one or more areas of interest resulting from changes in one or more objects within the field of interest.

2. The system of claim 1, wherein the merging a first video from the first image sensor and a second video from the second image sensor into a merged video comprises:

merging a first video from the first image sensor and a second video from the second image sensor into a merged video in real-time or near-real-time.

3. The system of claim 1, further comprising:

delivering the video window to a remote server via a network.

4. The system of claim 1, wherein the generating a video window based on the translated corresponding position of the one or more objects, wherein the video window displays the one or more areas of interest comprises:

generate a warped video window based on the translated corresponding position of the one or more objects, wherein the video window displays the one or more areas of interest.

5. The system of claim 1, wherein the generating a video window based on the translated corresponding position of the one or more objects, wherein the video window displays the one or more areas of interest comprises:

generate a dewarped video window based on the translated corresponding position of the one or more objects, wherein the video window displays the one or more areas of interest.

6. The system of claim 1, wherein the calibrating the one or more images of the first field of view and the second field of view comprises:

adjusting one or more orientation parameters the masthead based on the determined position and orientation.

7. The system of claim 1, wherein the first field of view is 90° to 110° and the second field of view is 90° to 110°.

8. The system of claim 1, wherein the first field of view and the second field of view overlap by 10-30% at a center portion of the field of interest.

9. The system of claim 1, wherein the masthead includes a network interface device.

10. The system of claim 1, wherein the masthead includes one or more mast processors.

11. The system of claim 1, wherein the one or more orientation sensors comprise: at least one of an accelerometer, a magnetometer, or a gyroscope.

12. The system of claim 1, wherein the first lens and second lens are configured to produce a warped image on the first image sensor and the second image sensor.

13. The system of claim 1, wherein the mast comprises a telescoping pole.

14. The system of claim 1, wherein the mast is removably coupled to the masthead and the base.

15. The system of claim 1, wherein the mast includes one or more cables for transferring at least one of power or data between the base and the masthead.

16. The system of claim 1, wherein the base includes one or more power supplies.

17. The system of claim 1, wherein the base includes one or more memory units.

18. The system of claim 1, wherein the base includes a network interface device.

19. A system comprising:

a masthead, wherein the masthead comprises:

a first image sensor and a second image sensor;

a first lens corresponding with the first image sensor and a second lens corresponding with the second image sensor, wherein the first image sensor is configured to capture a first video having a first field of view and the second image sensor is configured to capture a second video having a second field of view, wherein the first field of view and the second field of view overlap at a center portion of a field of interest;

a global positioning system receiver; and one or more orientation sensors, a mast; and a base, wherein the base is communicatively coupled to the masthead via one or more datalinks of the mast, wherein the base includes one or more base processors, wherein the one or more base processors are configured to:

determine a position of the masthead;

determine an orientation of the masthead relative to the field of interest based on one or more signals received from the one or more orientation sensors;

calibrate the first field of view and the second field of view, wherein the calibrating the first field of view and the second field of view comprises: comparing an expected position and orientation to a determined position and orientation; and adjusting one or more orientation parameters of the system to match the expected position and orientation;

identify one or more areas of interest within the first field of view and the second field of view;

record a location and time stamp of one or more objects within the one or more areas of interest;

merge the first video and the second video into a merged video;

translate a corresponding position of the one or more objects to the merged video;

generate a video window based on the translated corresponding position of the one or more objects, wherein the video window displays the one or more areas of interest; and automatically adjust the video window based on one or more adjustments to the one or more areas of interest resulting from changes in one or more objects within the field of interest.

* * * * *